(12) United States Patent
Uchida

(10) Patent No.: US 7,295,745 B2
(45) Date of Patent: Nov. 13, 2007

(54) METHOD FOR FABRICATING PERIODIC STRUCTURE

(75) Inventor: Tatsuro Uchida, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/411,783

(22) Filed: Apr. 27, 2006

(65) Prior Publication Data

US 2006/0245716 A1 Nov. 2, 2006

(30) Foreign Application Priority Data

Apr. 28, 2005 (JP) .............................. 2005-131644
Feb. 9, 2006 (JP) .............................. 2006-032502

(51) Int. Cl.
*G02B 6/10* (2006.01)
(52) U.S. Cl. ...................... 385/129; 385/131; 385/132; 385/14; 385/146; 438/618; 438/619; 438/629; 438/637
(58) Field of Classification Search ................ 438/618, 438/619, 629, 637, 638; 385/129, 131, 132, 385/14, 146
See application file for complete search history.

(56) References Cited

U.S. PATENT DOCUMENTS

| | | | | |
|---|---|---|---|---|
| 5,335,240 | A | * | 8/1994 | Ho et al. ........................ 372/39 |
| 5,600,483 | A | * | 2/1997 | Fan et al. ..................... 359/245 |
| 5,998,298 | A | * | 12/1999 | Fleming et al. ............. 438/692 |
| 6,521,136 | B1 | * | 2/2003 | Sfez et al. ...................... 216/24 |
| 6,593,894 | B1 | * | 7/2003 | Biswas et al. ............... 343/793 |
| 6,690,876 | B2 | * | 2/2004 | Sigalas ......................... 385/146 |
| 6,747,773 | B2 | * | 6/2004 | Theil et al. .................. 359/237 |
| 6,812,482 | B2 | * | 11/2004 | Fleming et al. ................ 257/17 |
| 6,993,235 | B2 | * | 1/2006 | Takagi et al. ................ 385/129 |
| 7,085,467 | B2 | * | 8/2006 | Ikemoto et al. ............. 385/129 |
| 7,151,629 | B2 | * | 12/2006 | Takagi et al. ................ 359/321 |
| 2001/0016247 | A1 | * | 8/2001 | Matsuura et al. ........... 428/188 |
| 2002/0146193 | A1 | * | 10/2002 | Hamada ....................... 385/15 |
| 2003/0013274 | A1 | * | 1/2003 | Noda .......................... 438/455 |
| 2003/0104700 | A1 | * | 6/2003 | Fleming et al. ............. 438/694 |
| 2005/0150864 | A1 | * | 7/2005 | Stasiak et al. ................. 216/41 |
| 2005/0207717 | A1 | * | 9/2005 | Takagi et al. ................ 385/129 |
| 2006/0027290 | A1 | * | 2/2006 | Iguchi et al. ................ 148/241 |
| 2006/0029349 | A1 | * | 2/2006 | Hoshi et al. ................. 385/129 |
| 2006/0083477 | A1 | * | 4/2006 | Takagi et al. ................ 385/147 |
| 2006/0262385 | A1 | * | 11/2006 | Takagi et al. ................ 359/321 |
| 2007/0025682 | A1 | * | 2/2007 | Takagi et al. ................ 385/147 |

* cited by examiner

*Primary Examiner*—George R. Fourson
*Assistant Examiner*—John M. Parker
(74) *Attorney, Agent, or Firm*—Fitzpatrick, Cella, Harper & Scinto

(57) ABSTRACT

A method for fabricating a periodic structure having a first layer constituted by a plurality of first columnar members arrayed at first intervals, and a second layer constituted by a plurality of second columnar members arrayed at second intervals in the direction different from the long-side direction of the first columnar members, wherein the first layer and the second layer are laminated to each other, the method including the steps of:

preparing the first columnar members, wherein each first columnar member has a first convex part on a surface, and the length of the first convex part in the long-side direction of the first columnar member is longer than the width of the second columnar members; and laminating the first columnar members and the second columnar members via the first convex parts.

8 Claims, 11 Drawing Sheets

FORMATION OF ROD HAVING CONVEX PART

LAMINATION OF THE RODS HAVING CONVEX PART

LAMINATION OF TWO OF THE STRUCTURE SHOWN IN FIG. 4B

LAMINATION OF TWO OF THE STRUCTURE SHOWN IN FIG. 4C FOR INCREASING THE CYCLE

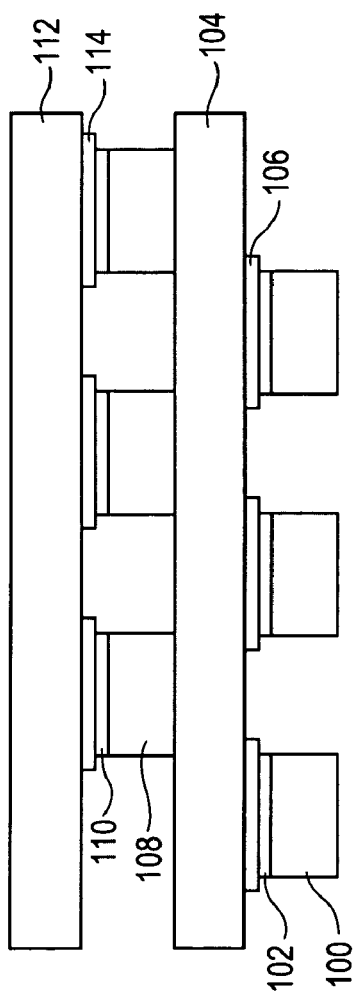
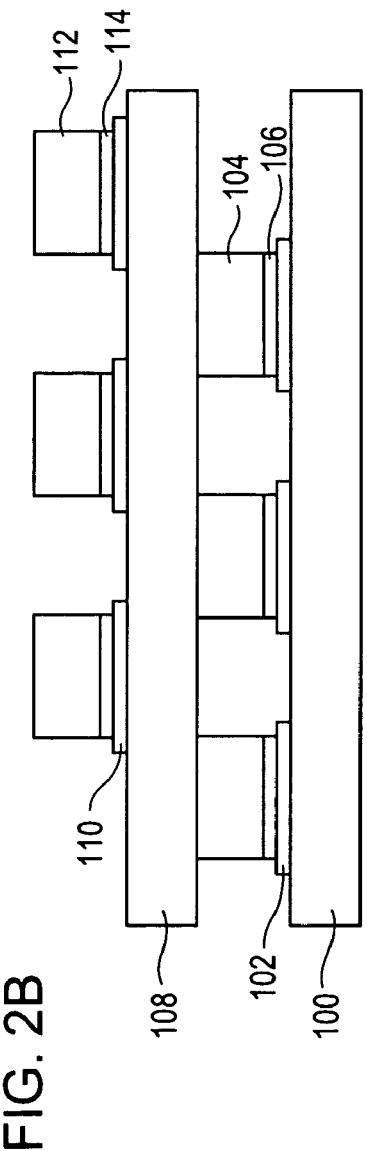

FORMATION OF ROD HAVING CONVEX PART

LAMINATION OF THE RODS HAVING CONVEX PART

LAMINATION OF TWO OF THE STRUCTURE SHOWN IN FIG. 4B

LAMINATION OF TWO OF THE STRUCTURE SHOWN IN FIG. 4C FOR INCREASING THE CYCLE

FORMATION OF ROD HAVING CONVEX PART

LAMINATION OF THE RODS HAVING CONVEX PART

LAMINATION OF TWO OF THE STRUCTURE SHOWN IN FIG. 7B

VIEW FROM THE DIRECTION ROTATED BY 90°

LAMINATION OF TWO OF THE STRUCTURE SHOWN IN FIG. 7C FOR INCREASING THE CYCLE

VIEW FROM THE DIRECTION ROTATED BY 90°

FORMATION OF ROD HAVING CONVEX PART
AND ROD NOT HAVING CONVEX PART

LAMINATION OF THE ROD HAVING CONVEX PART
AND THE ROD NOT HAVING CONVEX PART

LAMINATION OF TWO OF THE STRUCTURE SHOWN IN FIG. 9B

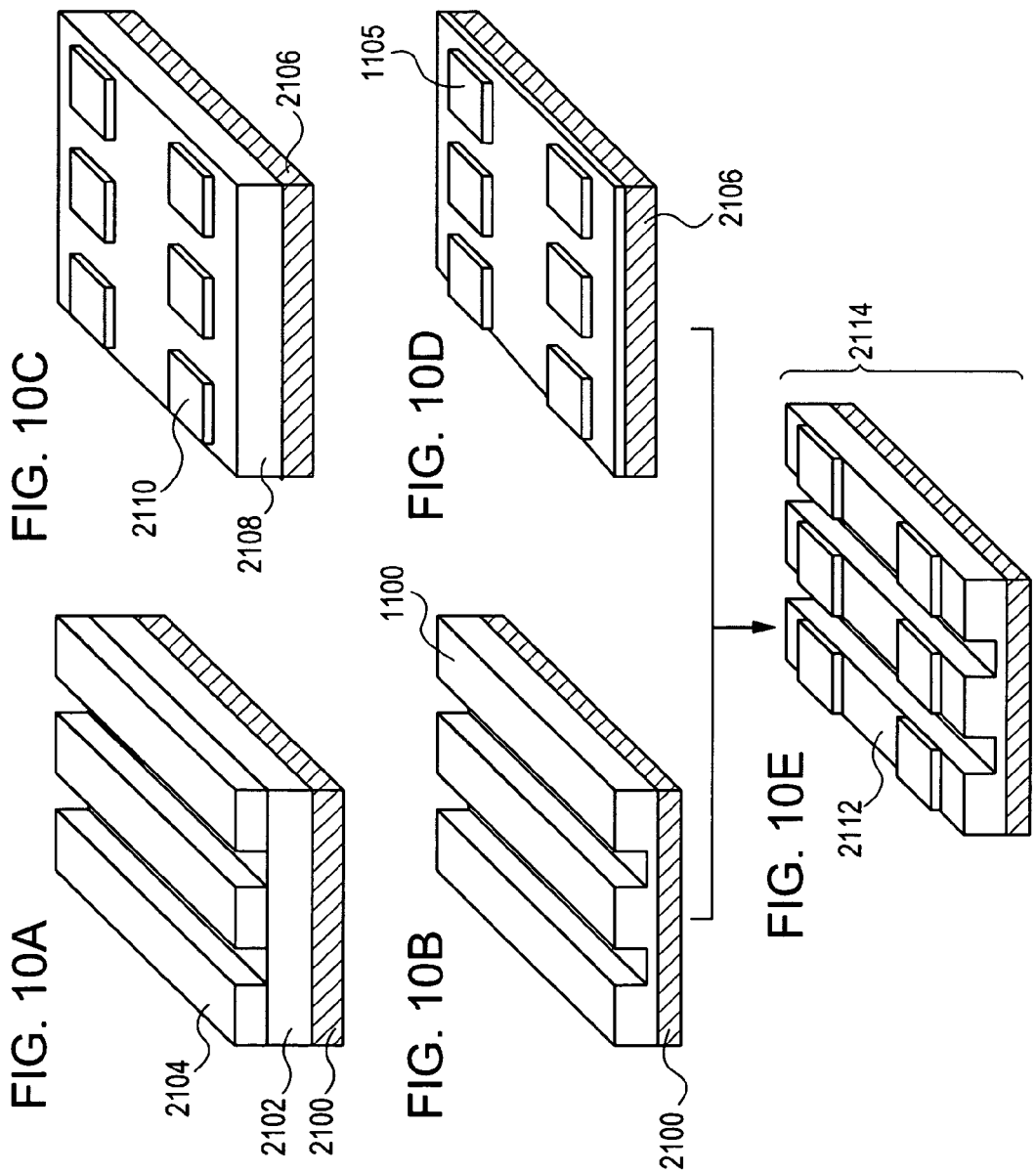

METHOD FOR FABRICATING PERIODIC STRUCTURE

BACKGROUND OF THE INVENTION

1. Field of the Invention

The present invention relates to methods for fabricating periodic structures.

2. Description of the Related Art

Photonic crystals having a periodic change in the refractive index with a periodicity being comparable to the light wavelength will be described. In semiconductors, a photonic band-gap (band-gap for light) is formed by a Bragg reflection of light waves by a periodic distribution of refractive index, similar to a band gap formed by a Bragg reflection of electron waves by periodic potential of atomic cores.

Some structures exhibiting such a photonic band-gap have been reported. In U.S. Pat. No. 5,335,240 (referred to as Patent Document 1, hereinafter), a woodpile structure which is one of three-dimensional periodic structures is proposed. This structure can exhibit a photonic band-gap (complete photonic band-gap) for incident light from all directions. The woodpile structure can perform various effects, such as controlling of spontaneous emission light, by exhibiting the complete photonic band-gap, and a functional element which is nonconventional can be achieved. For example, the appearance of a localization mode in a band can be achieved by introducing a defect structure formed by disarraying a part of the three-dimensional periodic structure; thus, a resonator which confines only light having a prescribed wavelength can be achieved. In order to achieve such a functional element, the appearance of a complete photonic band-gap having a broader wavelength band is further required.

SUMMARY OF THE INVENTION

The woodpile structure (FIG. 11) which is proposed in the Patent Document 1 is known as a three-dimensional periodic structure exhibiting a complete photonic band-gap. The woodpile structure is fabricated by stacking a two-dimensional periodic structure and exhibits a photonic band-gap, but it is pointed out that the band-gap is narrow.

Consequently, an object of the present invention is to provide a method for resolving the problem that the photonic band-gap in the woodpile structure is narrow.

The present invention provides a method for fabricating a periodic structure having a first layer constituted by a plurality of first columnar members arrayed at first intervals, and a second layer constituted by a plurality of second columnar members arrayed at second intervals in the direction different from the long-side direction of the first columnar members, wherein the first layer and the second layer are laminated to each other. The method includes the steps of:

preparing the first columnar members each having a first convex part on a surface such that the length of the first convex part in the long-side direction of the first columnar member is longer than the width of the second columnar members; and laminating the first columnar members and the second columnar members via the first convex parts.

The present invention provides a periodic structure which can exhibit a photonic band-gap broader than that provided by the conventional woodpile structure.

Further features of the present invention will become apparent from the following description of exemplary embodiments with reference to the attached drawings.

BRIEF DESCRIPTION OF THE DRAWINGS

FIGS. 2A and 2B are diagrams for describing a photonic crystal having a three-dimensional periodic structure according to the present invention.

FIGS. 10A to 10E are diagrams for describing a method for fabricating a photonic crystal structure according to the present invention.

DESCRIPTION OF THE EMBODIMENTS

A method in accordance with the present invention will now be described with reference to FIGS. 1A and 1B.

Figure 1A:
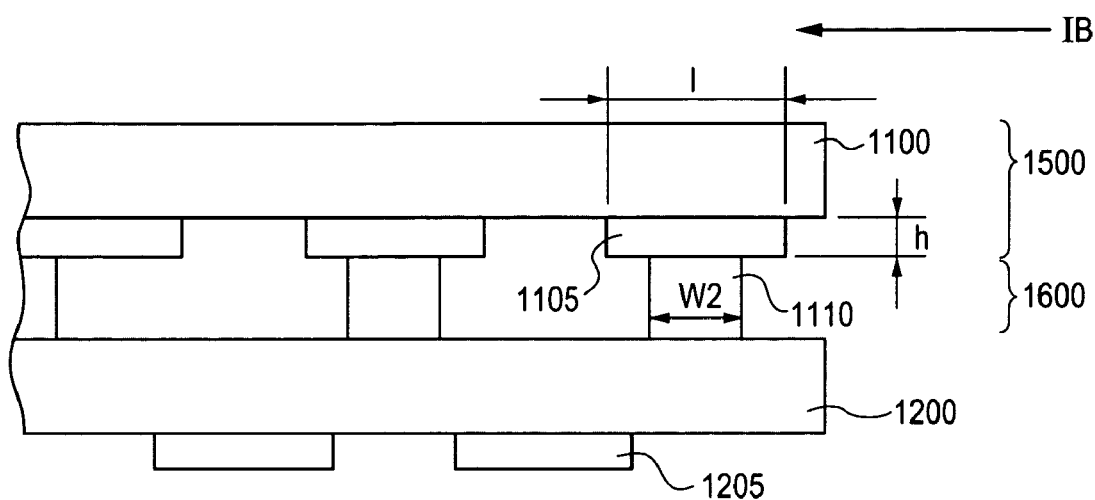
FIGS. 1A and 1B are diagrams for describing the present invention.

In FIG. 1A, reference numeral 1100 denotes a first columnar member, and reference numeral 1105 denotes a first convex part provided to the first columnar member. The length of the first convex part 1105 in the cross direction viewed in FIG. 1A is the length 1 (length in the long-side direction of the columnar member 1100) of the convex part. A plurality of the first convex parts 1105 and a plurality of the first columnar members 1100 form a first layer 1500. The first columnar members 1100 are arrayed from the front side toward the back side of the drawing sheet at first intervals.

Reference numeral 1110 denotes a second columnar member. The long-side direction of the second columnar member extends from the front side to the back side of the drawing sheet. A plurality of the second columnar members 1110 are arrayed to form a second layer 1600. Reference numeral 1200 denotes another first layer laminated to the bottom of the second layer (reference numeral 1205 denotes a convex part). The formation of the first layer on the bottom of the second layer is properly determined according to demand. It is also properly determined how many of the first and the second layers are laminated.

Figure 1B:
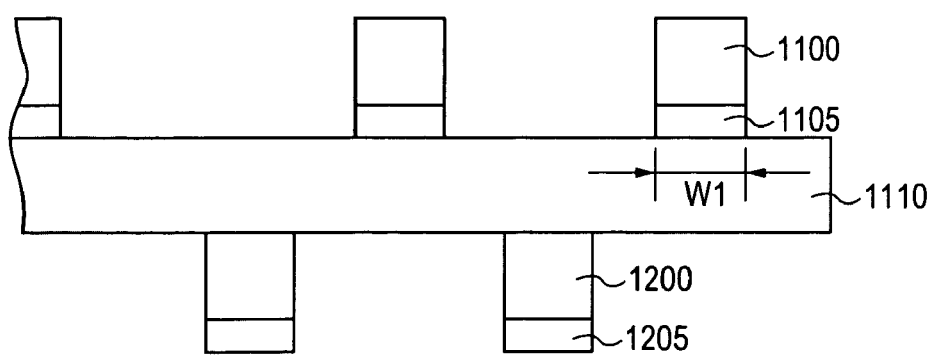

FIG. 1B is a diagram of the laminated structure shown in FIG. 1A viewed from the direction shown by an arrow IB which is parallel to the drawing sheet (i.e., viewed from the direction rotated by 90° from FIG. 1A). The second columnar members 1110 are arrayed at second intervals.

In the present invention, first, the first columnar members 1100 each having the first convex part 1105 on its surface are prepared in such a manner that the length l of the first convex part 1105 (the length in the long-side direction of the first columnar member 1100) is longer than a width W2 of the second columnar member 1110. Here, the width of the second columnar member 1110 is the width in the direction parallel to the length direction of the first convex part 1105. A method for forming such a convex part is described below.

Then, the second columnar members 1110 and the first convex parts 1105 are laminated; the first layer 1500 and the second layer 1600 are laminated to each other to form a periodic structure.

The first convex part 1105 is designed to have a length longer than the width W2 of the second columnar member 1110. As a result, the shape of the space formed by laminating the first layer and the second layer is more similar to a sphere compared with that formed by merely laminating the first columnar members and the second columnar members.

An inverse opal structure is known as a structure which exhibits a broad photonic band-gap. This structure is defined by a space when spheres are close-packed in a cube. Namely, this structure is defined by a gap where the cube is not filled with the close-packed spheres.

When the columnar members are stacked according to the present invention, the resulting structure can resemble the inverse opal structure in shape. Therefore, a band-gap broader than that of a periodic structure formed by merely laminating the columnar members can be obtained because of the formation of the structure similar to the inverse opal structure. Thus, a refractive-index periodic structure which has a periodicity in its refractive index can be obtained.

In the present invention, it is necessary that the length l of the first convex part is longer than the width W2 of the second columnar member. The length l of the convex part is preferably 1.1 times or more, more preferably 1.5 times or more, and further more preferably 2 times or more the width W2. The upper limit of the length l of the convex part is, for example, 10 times or less the width W2. However, when the first columnar members 1100 are each provided with a plurality of the first convex parts 1105 in the long-side direction of the first columnar member, it is necessary that the convex parts are not in contact with each other.

The thickness h of the first convex part (the length in the direction perpendicular to the long-side of the first columnar member, in other words, the length in the laminating direction) is 0.8 times or less, preferably 0.5 times or less, more preferably 0.2 times or less the height of the second columnar member (the length of the second member in the laminating direction, in other words, the length in the same direction as the thickness direction of the first convex part). The thickness h of the first convex part should be, for example, at least 0.001 times or more, more preferably 0.05 times or more the height of the second columnar member.

Furthermore, the first convex part 1105 can have steps so that the above-mentioned space shape is closer to a sphere shape. Additionally, the first convex part can be formed of a plurality of layers having a length l becoming shorter toward the second columnar member from the first columnar member side so that the value of the length l becomes closer to the value of the width W2 of the second columnar member.

FIGS. 1A and 1B show a structure in which the first columnar member 1100 has the convex part 1105 on its one face only, but the first columnar member may have the convex part on both faces. Additionally, both the first columnar member and the second columnar member may be provided with the convex parts. Then, the first and second columnar members may be laminated to each other via the convex parts provided to both the first and the second columnar members. In this case, the convex part provided to the second columnar member may be formed under the same conditions as those for providing the convex part to the first columnar member.

In FIG. 1B, the width W1 of the convex part is the same as that of the columnar member 1100, but the width is not limited to this. However, from the viewpoint of easiness of fabrication, it is desirable that the width W1 of the convex part is the same as the width W of the columnar member 1100. In addition, it is also desirable that the width and height (the length in the direction perpendicular to the long-side direction of the columnar member) of the second columnar member is the same as those of the first columnar member.

As described above, a second convex part may be provided to the second columnar member 1110 so that the first and the second convex parts are laminated to each other.

A group of the first columnar members constituting the first layer and a group of the second columnar members constituting the second layer are arrayed in directions different from each other. The angle formed by the first columnar member and the second columnar member may be 90° (namely, they are orthogonal to each other), but an angle other than 90° may be formed. Here, the angle formed by the first and the second columnar members is an angle when the laminated columnar members are viewed from the laminating direction.

Furthermore, the first columnar member 1100 may be provided with a plurality of the first convex parts 1105 at first periodic intervals, and the first periodic intervals may be the same as the above-mentioned second intervals (the distance between the second columnar members 1110).

The first columnar member may be provided with a plurality of third convex parts on the opposite face of the face on which the first convex parts are provided. The first convex parts and the third convex parts may be formed to shift from each other by a half of the periodic interval.

The first layers and the second layers may be alternately laminated, if necessary.

The material of the first convex part 1105 and the material of the first columnar member 1100 may be the same. In this case, as specifically shown in FIGS. 3A to 3D, a film 202 made of a material constituting the first columnar members is formed on a substrate 200, and then first masks 206 are formed on the film 202 at the positions corresponding to those of the first convex parts (FIG. 3B). Then, a second mask 208 is formed to coat the film 202 and the first masks 206, and grooves are formed on the second mask 208 at the first intervals (FIG. 3C). Then, the film 202 is removed at the portions corresponding to the grooves, and then the second mask 208 is removed. The first convex parts are formed by using the first masks (FIG. 3D).

The material of the first convex part 1105 and the material of the first columnar member 1100 may be different from each other. Specifically, the first columnar member 1100 and the first convex part 1105 are individually formed and are adhered to each other. The details will be described below with reference to FIGS. 10A to 10E.

Some exemplary embodiments according to the present invention will now be described.

A first aspect of the present invention includes the step of fabricating a two-dimensional periodic structure on a substrate by periodically forming rods (columnar members) each having convex parts on its surface and the step of laminating a plurality of the two-dimensional periodic structure. The two-dimensional periodic structures are laminated so that the convex parts of the two-dimensional periodic structures are in contact with each other and the rods of the two-dimensional periodic structures are orthogonal to each other.

Furthermore, in the rod having the convex parts on its surface, the convex parts may be periodically formed on the top face of the rod (the bottom face of the rod is in contact with the substrate), and the periodic intervals of the convex parts and the periodic intervals of the rods may be the same.

Additionally, in the rod having the convex parts on its surfaces, the convex parts may be periodically formed on the top face and bottom face of the rod (the bottom face of the rod is in contact with the substrate). The periodic intervals of the convex parts and the periodic intervals of the rods may be the same, and the convex parts formed on the top face of the rod and the convex parts formed on the bottom face may shift from each other by a half of the periodic interval.

The convex parts can be made of the same material as that of the rods and can be formed by processing the rods.

The width of the convex part is the same as that of the rod, and the length (parallel to the long-side direction of the rod) of the convex part is longer than the width of the convex part. The two-dimensional periodic structure may be fabricated by periodically forming the rods having the convex parts on the surface by dry etching using an etching mask of a multilayer film made of two layers having etching resistance different from that of each other.

In the step of fabricating the two-dimensional periodic structure, the dry etching of the rods may be performed by using a mask having a selection ratio lower than that of the mask for the convex parts. The mask having the low selection ratio is consumed at the same time of the completion of the etching of the rods so that the mask having a high selection ratio is exposed to the rod surfaces. The mask having the low selection ratio may be a resist film and the mask having the high selection ratio may be a metal film. With this constitution, a structure exhibiting a broad bandgap, which is similar to that in a diamond structure, can be fabricated by forming the convex parts by directly processing the rod surfaces, instead of laminating them, in the formation of a three-dimensional structure.

Another aspect of the present invention includes the steps of:

fabricating a two-dimensional periodic structure on a substrate by periodically forming rods each having convex parts on its surface;

fabricating a two-dimensional periodic structures on a substrate by periodically forming rods not having the convex part; and laminating the two-dimensional periodic structures to each other.

In the step of laminating the two-dimensional periodic structures, a plurality of the two-dimensional periodic structures of the rods having the convex parts on the surface and a plurality of the two-dimensional periodic structures of the rods not having the convex part are alternately laminated in such a manner that the rods having the convex part are orthogonal to the rods not having the convex part.

The present invention will now be specifically described with reference to several embodiments. In the present invention, the term periodic structure means a structure having a refraction index which periodically changes. Therefore, a structure having a predetermined space will be described. In addition, the space may be filled with air or filled with any material.

EMBODIMENTS

First Embodiment

FIGS. 2A and 2B are diagrams showing a part (one cycle) of a three-dimensional periodic structure (three-dimensional photonic crystal) fabricated by a method according to the present invention. In FIGS. 2A and 2B, reference numeral 100 denotes one of a plurality of rods, and reference numeral 102 denotes one of a plurality of convex parts formed on a surface of each rod 100. Similarly, reference numeral 104 denotes a rod, and reference numeral 106 denotes a convex part formed on a surface of the rod 104, and reference numeral 108 denotes a rod, and reference numeral 110 denotes a convex part formed on a surface of the rod 108, while reference numeral 112 denotes a rod, and reference numeral 114 denotes a convex part formed on a surface of the rod 112.

In the First Embodiment, each of the rods has convex parts on its one surface only. As shown in FIG. 2A, the rods are laminated in such a manner that each of the convex parts 102 formed on a surface of a rod 100 is in contact with the convex part 106 formed on a surface of a rod 104, and that the rods 100 and 104 are orthogonal to each other (the long-side of each rod 100 is orthogonal to the long-side of the rods 104).

Similarly, the rods are laminated in such a manner that each of the convex parts 110 formed on a surface of a rod 108 are in contact with the convex part 114 formed on a surface of a rod 112 and that the rods 108 and 112 are orthogonal to each other. Therefore, the rods 104 and 108 are laminated so as to be orthogonal to each other (the long-side of the rod b is orthogonal to the long-side of the rod c). Since each of the rods used in the First Embodiment has the convex parts on its one surface only, the rods 104 and 108 are in direct contact with each other, without contact between their respective convex parts.

FIG. 2B is a cross sectional view of the structure viewed from the direction rotated by 90° from FIG. 2A; a diagram showing the structure viewed from the direction shown by an arrow IIB.

FIGS. 3A to 3D are diagrams for describing a method for fabricating a two-dimensional periodic structure formed by periodically arrayed rods each having a convex part on its surface. The method is included in a method for fabricating a three-dimensional periodic structure (three-dimensional photonic crystal) according to the present invention. In these drawings, reference numeral 200 denotes a substrate (sapphire), reference numeral 202 denotes a dielectric (gallium nitride) layer, and reference numeral 204 denotes a metal (nickel) layer. Reference numeral 206 denotes a hard-mask (nickel) pattern, reference numeral 208 denotes a resist pattern, reference numeral 210 denotes a rod having a convex part on its surface, and reference numeral 212 denotes a two-dimensional periodic structure formed by periodically arrayed rods each having the convex part on its surface.

Figure 3A:
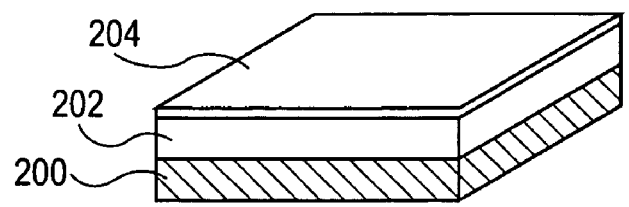
FIGS. 3A to 3D are diagrams for describing a method for fabricating a two-dimensional periodic structure formed by periodically arrayed rods each having a convex part on its surface.
Figure 3B:
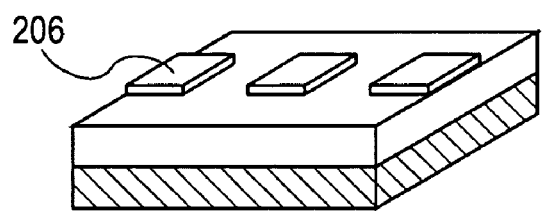
Figure 3C:
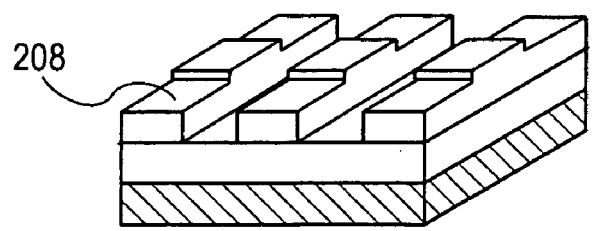
Figure 3D:
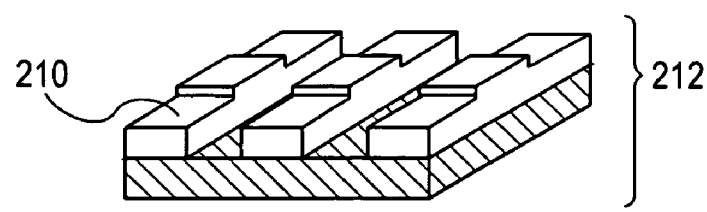

As shown in FIG. 3A, a GaN layer 202 is grown on a sapphire substrate 200 via a buffer layer (not shown) with a metal-organic chemical vapor deposition (MOCVD) system. Then, a Ni layer 204 is formed with an electron-beam evaporation system.

Then, as shown in FIG. 3B, a hard-mask pattern 206 of Ni is formed by using electron-beam lithography and etching technologies.

Furthermore, as shown in FIG. 3C, a resist pattern 208 is formed by the application of resist by using an electron-beam lithography technology.

Then, as shown in FIG. 3D, a GaN layer 202 is etched by dry etching using a reactive ion-beam etching system. On this occasion, the rods are periodically formed by means of the resist pattern 208; a two-dimensional periodic structure is formed. After the disappearance of the resist pattern 208, the convex parts are formed on the rods by means of the hard-mask pattern 206. Then, a two-dimensional periodic structure 212 with the periodically formed GaN rods 210 each having the convex part on its surface is obtained by removing the hard-mask pattern 206.

FIGS. 4A to 4D are diagrams describing a method for fabricating a three-dimensional periodic structure (three-dimensional photonic crystal). In these drawings, reference numeral 300 denotes a two-dimensional periodic structure formed on a substrate by periodically arrayed rods each having a convex part on its surface. Reference numeral 302 denotes a partial three-dimensional structure formed by laminating two of the two-dimensional periodic structure 300. Reference numeral 304 denotes one cycle of the three-dimensional periodic structure formed by laminating four of the two-dimensional periodic structure, and reference numeral 306 denotes two cycles of the three-dimensional periodic structure formed by laminating the two-dimensional periodic structure.

Figure 4A:
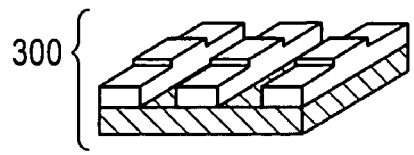
FIGS. 4A to 4D are diagrams for describing a method for fabricating a photonic crystal having a three-dimensional periodic structure formed by periodically arrayed rods each having a convex part on its surface.

As shown in FIG. 4A, a two-dimensional periodic structure 300 is formed on a substrate by periodically arrayed GaN rods each having a convex part on its surface.

Figure 4B:
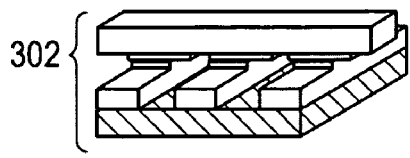

Then, as shown in FIG. 4B, two of the two-dimensional periodic structure 300 shown in FIG. 4A are laminated in such a manner that the convex parts on the surfaces of the rods are in contact with each other and the rods are orthogonal to each other, and a partial three-dimensional periodic structure 302 is fabricated by removing one substrate (not shown) of the two.

Figure 4C:

As shown in FIG. 4C, two of the partial three-dimensional periodic structures 302 shown in FIG. 4B are arranged in such a manner that the rods are orthogonal to each other. Specifically, the two-dimensional periodic structures are laminated in such a manner that the first layer (two-dimensional periodic structure) and the third layer (two-dimensional periodic structure) from the substrate are shifted from each other by a half of the periodic interval, and that the second layer (two-dimensional periodic structure) and the fourth layer (two-dimensional periodic structure) from the substrate are shifted from each other by a half of the periodic interval. Then, one substrate (not shown) of the two is removed to fabricate one cycle of the three-dimensional periodic structure 304.

Figure 4D:
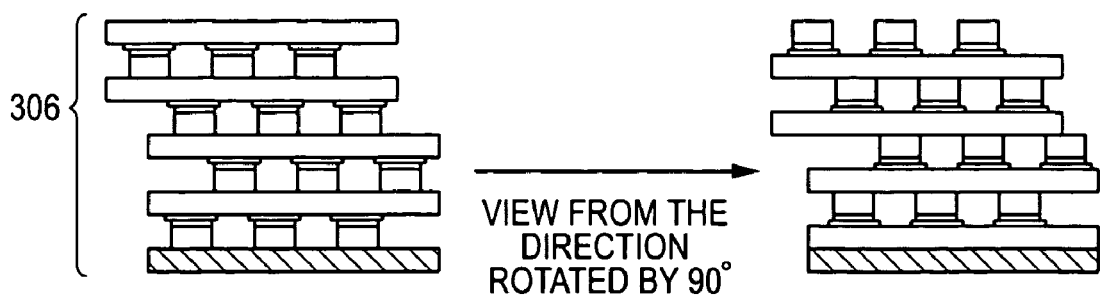

As shown in FIG. 4D, two of the one-cycle three-dimensional periodic structures 304 shown in FIG. 4C are laminated in such a manner that the rods are orthogonal to each other and that the rods of the alternate layers are shifted from each other by a half of the periodic interval. Then, one substrate (not shown) is removed from the two to form two cycles of the three-dimensional periodic structure 306. In this fabrication, the portions other than the rods and the substrate are filled with air.

For example, the width of a complete photonic band-gap of the structure shown in Table 1 was determined by applying a plane-wave expansion method, and it was confirmed that the width was about 33% broader than that of a complete photonic band-gap of a conventional woodpile structure shown in Table 2. Therefore, a three-dimensional periodic structure having a broader complete photonic band-gap compared with that in the conventional woodpile structure can be readily fabricated by applying the method described in the First Embodiment to the fabrication of the structure shown in Table 1. In addition, the medium used for the rods (including the convex parts) of both structures had a refractive index of 2.33, and the medium for portions other than the rods (including the convex parts) of both structures had a refractive index of 1. The central wavelength of the photonic band-gap was 530 nm.

TABLE 1

| | |
| --- | --- |
| Rod width | 88 nm |
| Rod thickness | 57 nm |
| Rod periodic interval | 246 nm |
| Convex-part width | 88 nm |
| Convex-part length (the long-side direction of rod) | 150 nm |
| Convex-part thickness | 29 nm |
| Convex-part periodic interval | 246 nm |

TABLE 2

| | |
| --- | --- |
| Rod width | 84 nm |
| Rod thickness | 84 nm |
| Rod periodic interval | 239 nm |

In the First Embodiment, GaN was used as a medium for the rods (including the convex parts), but the medium is not limited to this. The medium may be a dielectric material such as GaAs, InP, Si, and $TiO_2$.

In the First Embodiment, portions other than the rods and the substrate were air, but the portions may be filled with a material having a refractive index lower than that of the material for the rod. In such a case, the refractive index ratio may be 2 or more.

The apparatuses used for the growth, formation, and etching of films are not limited to those described in the First Embodiment. Any apparatus which can perform the similar effects can be used.

In the First Embodiment, two cycles of the three-dimensional periodic structure are fabricated by laminating two of the one-cycle three-dimensional periodic structures, but the two cycles of the three-dimensional periodic structure may be fabricated by laminating the two-dimensional periodic structure formed by periodically arrayed rods each having the convex part on its surface one by one.

In the First Embodiment, a method for fabricating two cycles of the three-dimensional periodic structure is shown, but the number of the cycles of the three-dimensional periodic structure is not limited to two. By repeating the method described in the First Embodiment, intended cycles of the three-dimensional periodic structure can be fabricated.

Second Embodiment

This embodiment is a lamination of two-dimensional periodic structures formed by rods each having convex parts on the top and bottom faces (opposing faces) of the rods.

Figure 5A:
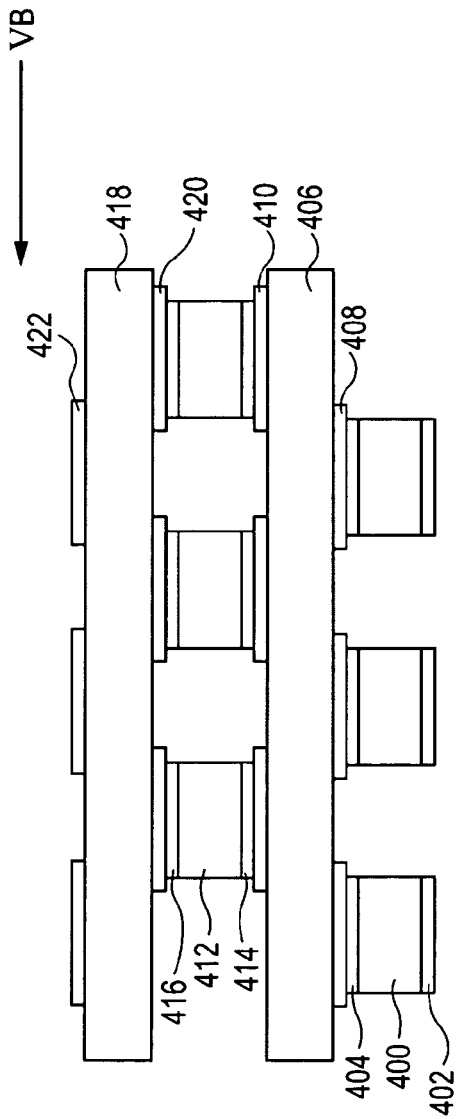
FIGS. 5A and 5B are diagrams for describing a photonic crystal having a three-dimensional periodic structure.
Figure 5B:
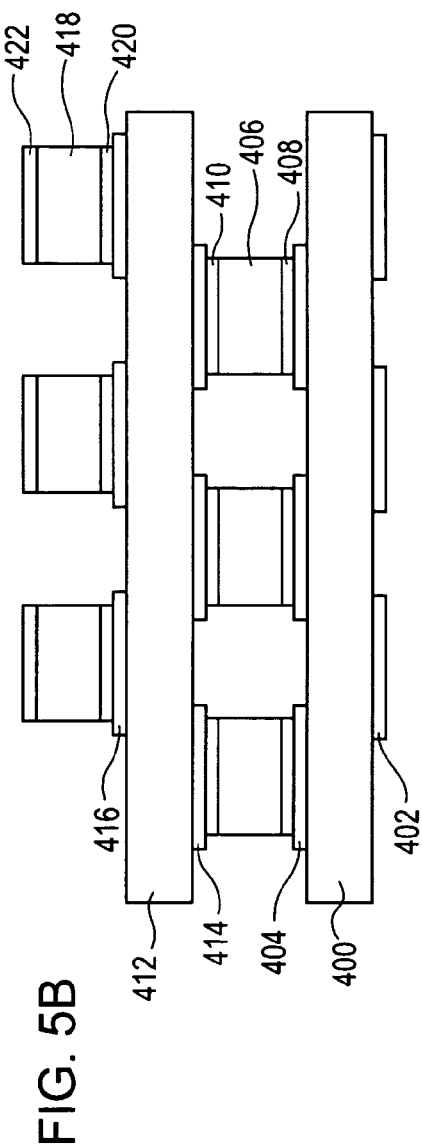

FIGS. 5A and 5B are diagrams showing a part (one cycle) of a three-dimensional periodic structure (three-dimensional photonic crystal) which is fabricated by a method in accordance with the present invention. In FIGS. 5A and 5B, reference numeral 400 denotes one of a plurality of rods, reference numerals 402 and 404 denote convex parts formed on surfaces of the rods 400, reference numeral 406 denotes one of another plurality of rods, and reference numerals 408 and 410 denote convex parts formed on surfaces of the rods 406. Similarly, reference numeral 412 denotes one of a plurality of rods, reference numerals 414 and 416 denote convex parts formed on surfaces of the rods 412, reference numeral 418 denotes another plurality of rods, and reference numerals 420 and 422 denote convex parts formed on surfaces of the rods 418.

Each rod used in the Second Embodiment has the convex parts on two surfaces, a face coming into contact with the substrate, and the face opposing it. As shown in FIGS. 5A and 5B, the convex parts 404 formed on the surface of each rod 400 and the convex part 408 formed on the surface of each rod 406 are in contact with each other. Additionally, the rod 400 and the rod 406 are laminated so as to be orthogonal to each other (the long-side of each rod 400 is orthogonal to the long-side of the rods 406).

Similarly, the convex part 410 formed on the surface of each rod 406 and the convex part 414 formed on the surface of each rod 412 are in contact with each other, and the rod 406 and the rod 412 are laminated so as to be orthogonal to each other. Furthermore, the convex part 416 formed on the surface of each rod 412 and the convex part 420 formed on the surface of each rod 418 are in contact with each other, and the rods 412 and 418 are laminated so as to be orthogonal to each other.

By laminating the rods in such a manner, a three-dimensional periodic structure is formed through the contact between the convex parts formed on the surface of each rod at the positions where the rods cross each other.

FIGS. 6A to 6G are diagrams describing processes for fabricating a two-dimensional periodic structure formed by periodically arrayed rods each having convex parts on its surfaces opposing each other. The thus fabricated two-dimensional periodic structure is used for fabricating a three-dimensional periodic structure in accordance with the Second Embodiment of the present invention.

In these drawings, reference numeral 500 denotes a substrate (silicon), reference numeral 502 denotes silicon oxide, reference numeral 504 denotes a mask (silicon oxide) pattern for growth of a layer, reference numeral 506 denotes a dielectric (gallium nitride) layer, reference numeral 508 denotes a metal (nickel) layer, and reference numeral 510 denotes a hard-mask (nickel) pattern. Reference numeral 512 denotes a resist pattern, reference numeral 514 denotes a rod having convex parts on surfaces opposing each other, and reference numeral 516 denotes a two-dimensional periodic structure formed by periodically arrayed rods each having the convex parts on its surfaces opposing each other.

Figure 6A:
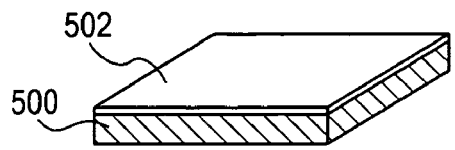
FIGS. 6A to 6G are diagrams for describing a method for fabricating a two-dimensional periodic structure formed by periodically arrayed rods each having convex parts on its surfaces opposing each other.
Figure 6B:
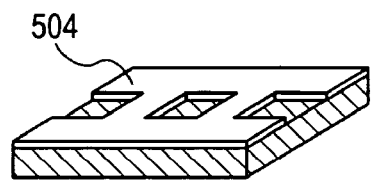
Figure 6C:
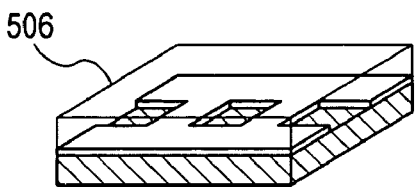
Figure 6D:
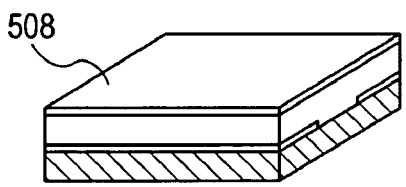
Figure 6E:
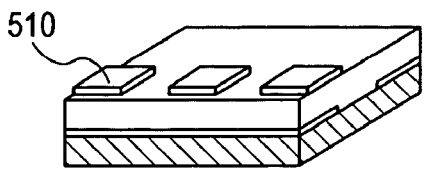
Figure 6F:
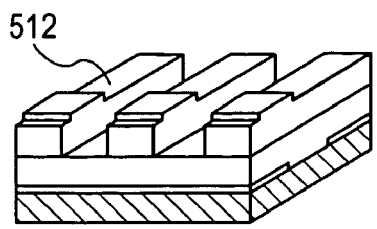
Figure 6G:
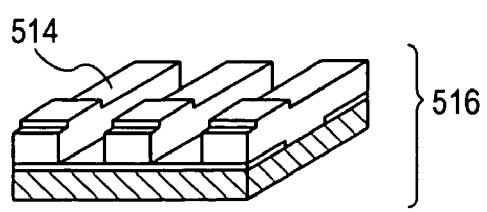

As shown in FIG. 6A, a silicon oxide layer 502 is formed on a silicon substrate 500 by a chemical vapor deposition (CVD) method. Then, as shown in FIG. 6B, a mask (silicon oxide) pattern 504 for growth of a layer is formed on the silicon substrate 500 by using electron-beam lithography and etching technology. Furthermore, as shown in FIG. 6C, a gallium nitride (GaN) layer 506 is grown by using an MOCVD system through a buffer layer. Then, as shown in FIG. 6D, a Ni layer 508 is formed by using an electron-beam evaporation system. As shown in FIG. 6E, a hard-mask pattern 510 of Ni is then formed by using electron-beam lithography and etching technology, and, as shown in FIG. 6F, a resist pattern 512 is formed by applying resist by using electron-beam lithography technology. Then, as shown in FIG. 6G, the GaN layer 506 is etched by dry etching using an inductively coupled plasma-reactive ion etching (ICP-RIE) system. By these steps the rods are periodically formed by means of the resist pattern 512, so that a two-dimensional periodic structure is formed. After the disappearance of the resist pattern 512, the convex parts are formed on the rods by means of the hard-mask pattern 510. Then, a two-dimensional periodic structure 516 formed with the periodically formed GaN rods 514 each having the convex parts on its surfaces opposing each other is obtained by removing the hard-mask pattern 510.

FIGS. 7A to 7D are diagrams describing a method for fabricating a three-dimensional periodic structure (three-dimensional photonic crystal). In these drawings, reference numeral 600 denotes a two-dimensional periodic structure formed on a substrate by periodically arrayed rods each having convex parts on its surfaces, and reference numeral 602 denotes a partial three-dimensional periodic structure formed by laminating two of the two-dimensional periodic structure 600. Reference numeral 604 denotes one cycle of the three-dimensional periodic structure formed by laminating four of the two-dimensional periodic structures 600, and reference numeral 606 denotes two cycles of the three-dimensional periodic structure formed by laminating the two-dimensional periodic structure 600.

Figure 7A:
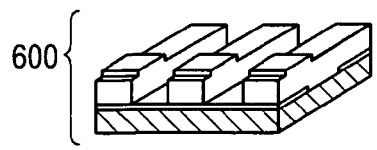
FIGS. 7A to 7D are diagrams for describing a method for fabricating a photonic crystal having a three-dimensional periodic structure formed by periodically arrayed rods each having convex parts on its surfaces opposing each other.

As shown in FIG. 7A, a two-dimensional periodic structure 600 is fabricated on a substrate by periodically arrayed GaN rods each having convex parts on its surfaces opposing each other.

Figure 7B:
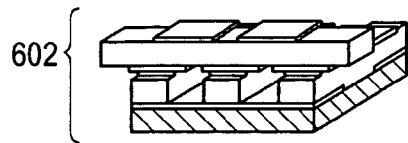

Then, as shown in FIG. 7B, two of the two-dimensional periodic structure 600 shown in FIG. 7A are laminated in such a manner that the convex parts on the surfaces of the rods are in contact with each other and the rods are orthogonal to each other (the long-sides of the rods are orthogonal to each other). Then, one substrate from the two is removed to fabricate a partial three-dimensional periodic structure 602.

Figure 7C:
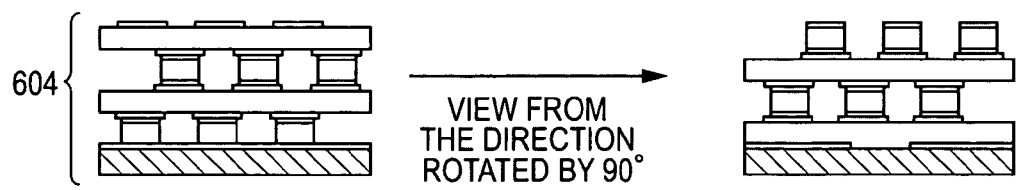

As shown in FIG. 7C, two of the partial three-dimensional periodic structures shown in FIG. 7B are arranged in such a manner that the rods are orthogonal to each other (the long-side of the rods are orthogonal to each other).

Specifically, four layers are laminated in such a manner that the first layer (two-dimensional periodic structure) and the third layer (two-dimensional periodic structure) from the substrate are shifted from each other by a half of the periodic interval, and that the second layer (two-dimensional periodic structure) and the fourth layer (two-dimensional periodic structure) from the substrate are shifted from each other by a half of the periodic interval.

Figure 7D:
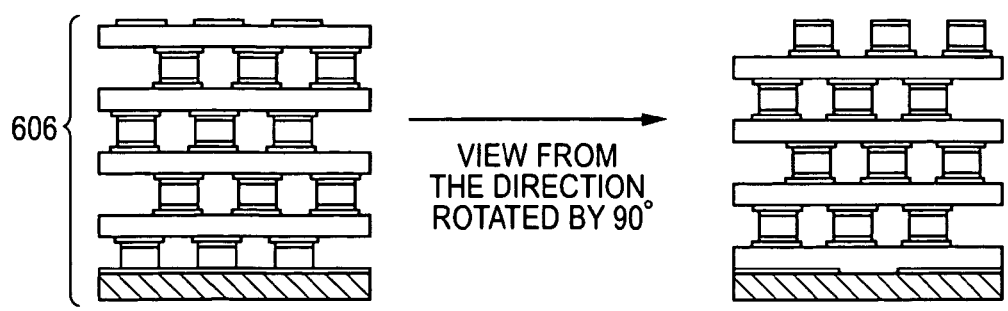

Then, by removing one substrate (not shown) from the two, one cycle of the three-dimensional periodic structure 604 is fabricated. As shown in FIG. 7D, two of the one-cycle three-dimensional periodic structure 604 shown in FIG. 7C are then laminated in such a manner that the rods are orthogonal to each other and that the periods of the alternate layers are shifted from each other by a half of the periodic interval. Then, by removing one substrate (not shown) of the two, two cycles of the three-dimensional periodic structure 606 are formed. In this fabrication, the portions other than the rods and the substrate are filled with air.

For example, the width of a complete photonic band-gap of the structure shown in Table 3 was determined by applying a plane-wave expansion method, and it was confirmed that the width was about 33% broader than that of a complete photonic band-gap of a conventional woodpile structure having a structure corresponding to Table 2. Therefore, a three-dimensional periodic structure having a broader complete photonic band-gap compared with that in the conventional woodpile structure can be readily fabricated by applying the method described in the Second Embodiment to the fabrication of the structure of Table 3. In addition, the medium used for the rods (including the convex parts) of both structures had a refractive index of 2.33, and the medium for portions other than the rods (including the convex parts) of both structures had a refractive index of 1. The central wavelength of the photonic band-gap was 530 nm.

TABLE 3

| | |
|---|---|
| Rod width | 80 nm |
| Rod thickness | 45 nm |
| Rod periodic interval | 259 nm |
| Convex-part width | 80 nm |
| Convex-part length (in the long-side direction of rod) | 171 nm |
| Convex-part thickness | 23 nm |
| Convex-part periodic interval | 259 nm |

In the Second Embodiment, GaN was used as a medium for the rods (including the convex parts), but the medium is not limited to this. The medium may be a dielectric material such as GaAs, InP, Si, and $TiO_2$.

In the Second Embodiment, portions other than the rods and the substrate were air, but the portions may be filled with a material having a refractive index lower than that of the material for the rod. In such a case, the refractive index ratio may be 2 or more.

The apparatuses used for the growth, formation, and etching of films are not limited those described in the Second Embodiment. Any apparatus which can perform the similar effects can be used.

In the Second Embodiment, two cycles of the three-dimensional periodic structure are fabricated by laminating two of the three-dimensional periodic structure, but the two cycles of the three-dimensional periodic structure may be fabricated by laminating the two-dimensional periodic structure formed by periodically arrayed rods each having the convex parts on its surfaces opposing each other one by one.

In the Second Embodiment, a method for fabricating two cycles of the three-dimensional periodic structure is disclosed, but the number of the cycles of the three-dimensional periodic structure is not limited to two. By repeating the method described in the Second Embodiment, intended cycles of the three-dimensional periodic structure can be fabricated.

Third Embodiment

This embodiment provides an alternate lamination of two-dimensional periodic structures formed by rods each having convex parts on its top and bottom faces (opposing faces) and two-dimensional periodic structures formed by rods not having convex parts.

Figure 8A:
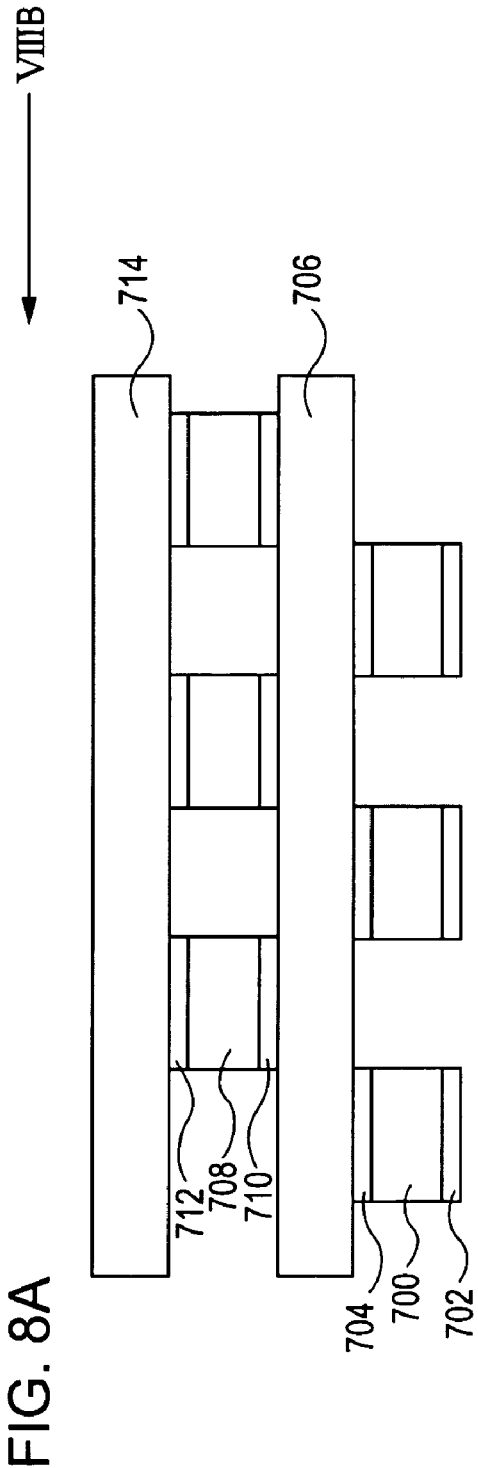
FIGS. 8A and 8B are diagrams for describing a photonic crystal having a three-dimensional structure.
Figure 8B:
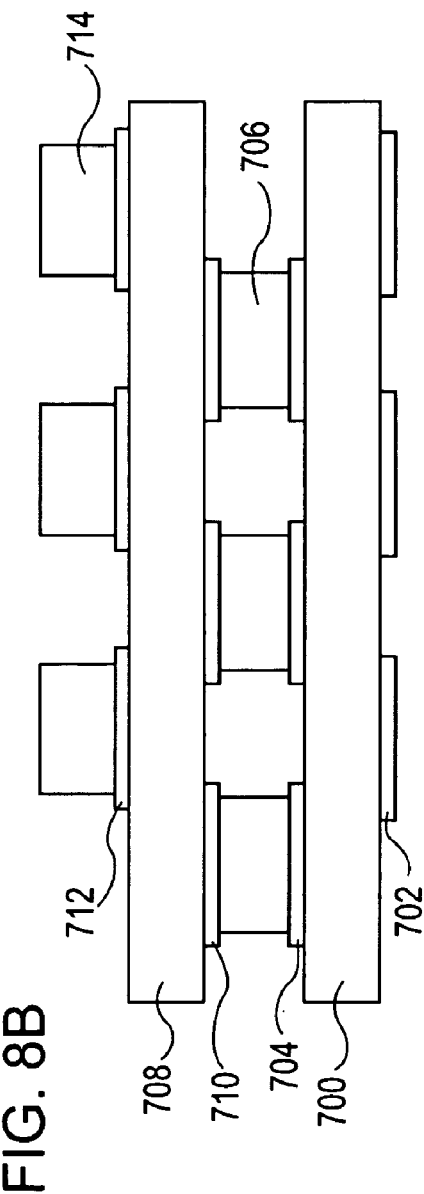

FIGS. 8A and 8B are diagrams showing a part (one cycle) of a three-dimensional periodic structure (three-dimensional photonic crystal) which is fabricated by a method in accordance with the present invention. In FIGS. 8A and 8B, reference numeral 700 denotes a plurality of rods, reference numerals 702 and 704 denote convex parts formed on the surfaces of the rods 700, reference numeral 706 denotes a plurality of rods, reference numeral 708 denotes a plurality of rods, reference numerals 710 and 712 denote convex parts formed on the rods 708, and reference numeral 714 denotes a plurality of rods.

In the rod having the convex parts of the Third Embodiment, the convex parts are formed on two surfaces of the rod on a face coming into contact with the substrate, and on the face opposing it. As shown in FIGS. 8A and 8B, the convex parts 704 formed on the surface of the rods 700 are in contact with the rods 706. Additionally, the rods 700 and 706 are laminated so as to be orthogonal to each other.

Similarly, the rods 706 are in contact with the convex parts 710 formed on the surface of the rods 708, and the rods 706 and 708 are laminated so as to be orthogonal to each other. Furthermore, the convex parts 712 formed on the surface of the rods 708 are in contact with the rods 714, and the rods 708 and 714 are laminated so as to be orthogonal to each other.

By laminating the rods in such a manner, a three-dimensional periodic structure is formed via the convex parts formed on the rods, wherein each convex part is in contact with another rod at the position where the two rods meet at right angles. The two-dimensional periodic structures formed by periodically arrayed rods each having the convex parts on its surfaces opposing each other and the rods not having the convex parts can be fabricated by the same methods described in the First and Second Embodiments.

Figure 9A:
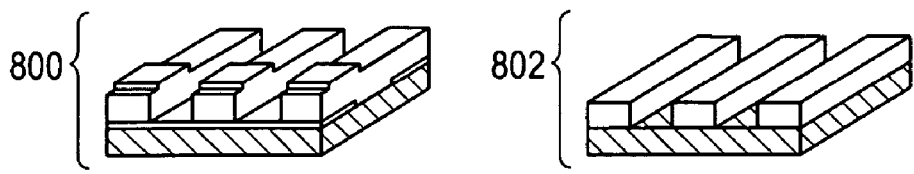
FIGS. 9A to 9C are diagrams for describing a method for fabricating a photonic crystal having a three-dimensional periodic structure formed by periodically arrayed rods each having convex parts on its surfaces opposing each other and rods not having the convex part, alternately.
Figure 9B:
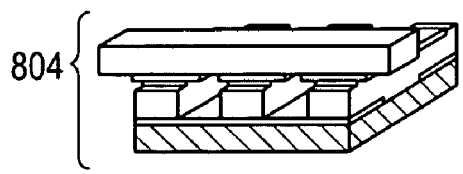
Figure 9C:
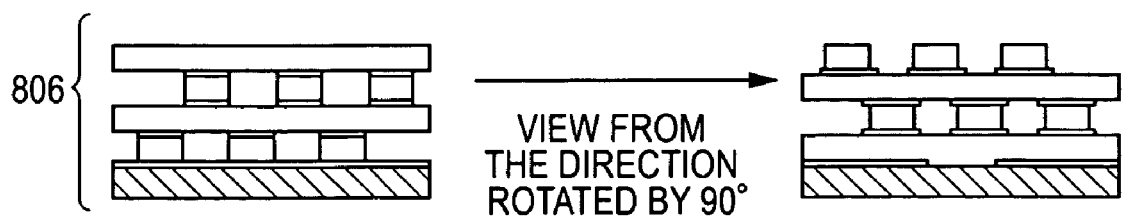
Figure 11:
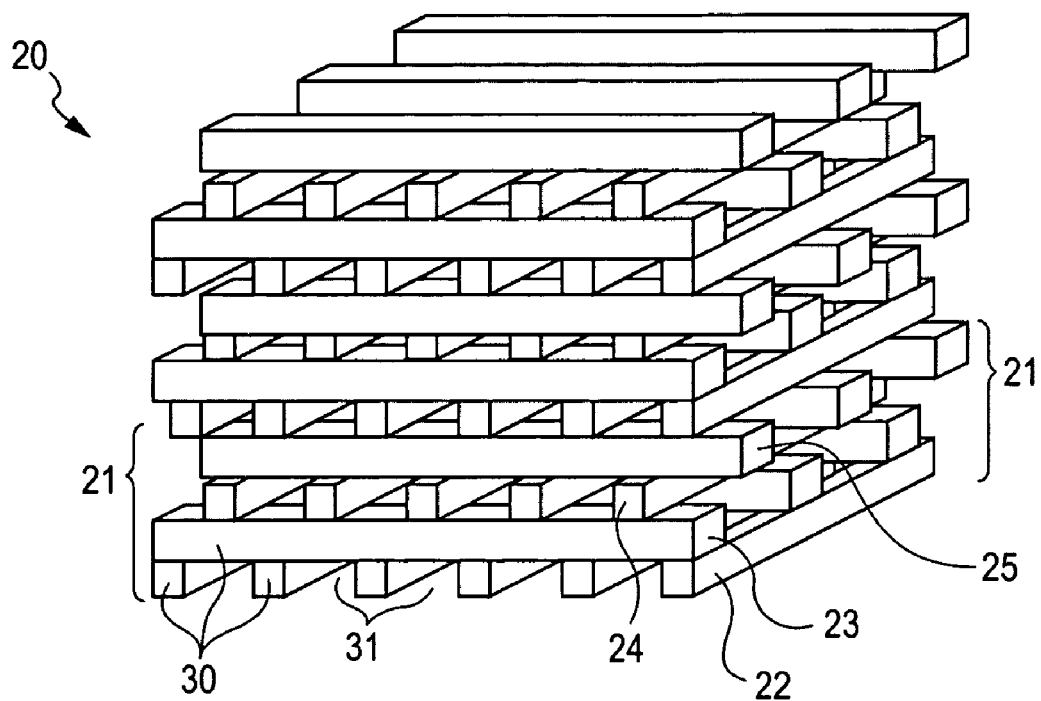
FIG. 11 is a diagram for describing a conventional technology.

FIGS. 9A to 9C are diagrams describing a method for fabricating another three-dimensional periodic structure (three-dimensional photonic crystal).

As shown in FIG. 9A, a two-dimensional periodic structure 800 formed by periodically arrayed GaN rods each having convex parts on its surfaces opposing each other is formed on a substrate, and a two-dimensional periodic structure 802 formed by periodically arrayed GaN rods not having the convex part is formed on a substrate.

As shown in FIG. 9B, the two-dimensional periodic structure 800 and the two-dimensional periodic structure 802 prepared in the step shown in FIG. 9A are laminated in such a manner that the rod not having the convex part comes in contact with the convex part of the rod having the convex parts on its surfaces and the rods are orthogonal to each other (the long-sides of the rods are orthogonal to each other).

Then, a partial three-dimensional periodic structure 804 is fabricated by removing one substrate (not shown).

By these steps there is provided a partial three-dimensional periodic structure (not shown) having a configuration which is reverse to that of the partial three-dimensional periodic structure 804 (i.e., the rods not having the convex parts are disposed on a substrate and the rods having the convex parts are disposed on the rods not having the convex parts) is also fabricated.

As shown in FIG. 9C, the two types of the partial three-dimensional periodic structures prepared in the step of FIG. 9B are laminated in such a manner that the rods not having the convex parts come in contact with the convex parts of the rods having the convex parts on its surfaces and the rods are orthogonal to each other (the long-sides of the rods are orthogonal to each other). Specifically, four layers are laminated in such a manner that the first layer (two-dimensional periodic structure) and the third layer (two-dimensional periodic structure) from the substrate are shifted from each other by a half of the periodic interval, and that the second layer (two-dimensional periodic structure) and the fourth layer (two-dimensional periodic structure) from the substrate are shifted from each other by a half of the periodic interval. One cycle of the three-dimensional periodic structure 806 is fabricated by removing one substrate (not shown). Then, two of the one-cycle three-dimensional periodic structures 806 fabricated in the step shown in FIG. 9C are laminated in such a manner that the rods not having the convex parts come in contact with the convex parts of the rods having the convex parts on its surfaces and that the rods of the alternate layers are shifted from each other by a half of the periodic interval. Then, two cycles of the three-dimensional periodic structure is fabricated by removing one substrate (not shown). In this fabrication, the portions other than the rods and the substrate are filled with air.

For example, the width of a complete photonic band-gap of the structure referred to in Table 4 was determined by applying a plane-wave expansion method, and it was confirmed that the width was about 9% broader than that of a complete photonic band-gap of a conventional woodpile structure having a structure corresponding to Table 2. Therefore, a three-dimensional periodic structure having a broader complete photonic band-gap compared with that in the conventional woodpile structure can be readily fabricated by applying the method described in the Third Embodiment to the fabrication of the structure referred to in Table 4. In addition, the medium used for the rods (including the convex parts) of both structures had a refractive index of 2.33, and the medium for portions other than the rods (including the convex parts) of both structures had a refractive index of 1. The central wavelength of the photonic band-gap was 530 nm.

TABLE 4

| | |
|---|---|
| Rod width | 91 nm |
| Rod thickness | 67 nm |
| Rod periodic interval | 246 nm |
| Convex-part width | 91 nm |
| Convex-part length (in the long-side direction of rod) | 91 nm |
| Convex-part thickness | 20 nm |
| Convex-part periodic interval | 246 nm |

In the Third Embodiment, GaN was used as a medium for the rods (including the convex parts), but the medium is not limited to this. The medium may be a dielectric material such as GaAs, InP, Si, and $TiO_2$.

In the Third Embodiment, portions other than the rods and the substrate were air, but the portions may be filled with a material having a refractive index lower than that of the material for the rod. In such a case, the refractive index ratio may be 2 or more.

In the Third Embodiment, two cycles of the three-dimensional periodic structure are fabricated by laminating one cycle of the three-dimensional periodic structure, but the two cycles of the three-dimensional periodic structure may be fabricated by alternately laminating the two-dimensional periodic structure formed by periodically arrayed rods each having the convex parts on its surfaces opposing each other and the two-dimensional periodic structure formed by periodically arrayed rods not having the convex parts.

In the Third Embodiment, a method for fabricating two cycles of the three-dimensional periodic structure is shown, but the number of the cycles of the three-dimensional periodic structure is not limited to two. By repeating the method described in the Third Embodiment, intended cycles of the three-dimensional periodic structure can be fabricated.

Fourth Embodiment

FIGS. 10A to 10E show another method for fabricating a three-dimensional photonic crystal structure in accordance with the present invention. In these drawings, reference numerals 2100 and 2106 denote a substrate. Reference numerals 2102 and 2108 denote a dielectric layer made of a first material and a dielectric layer made of a second material, respectively. Reference numerals 2104 and 2110 denote a resist pattern. At first, members shown in FIGS. 10A and 10C are prepared. Then, as shown in FIGS. 10B and 10D, the dielectric layer 2102 is etched by utilizing the resist pattern 2104 to form columnar members 1100, and the dielectric layer 2108 is etched by utilizing the resist pattern 2110 to form convex parts 1105. The thus prepared columnar members 1100 and the convex parts 1105 are brought into direct contact with each other (FIG. 10E). Then, the substrate 2106 is removed by a laser lift-off process or the like. Thus, the convex part made of a material different from the material for the columnar member can be formed on the columnar member.

The periodic structure in accordance with the present invention can be applied to optical devices such as lasers (for example, surface-emitting lasers) and mirrors.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

This application claims the benefit of Japanese Application No. 2005-131644 filed Apr. 28, 2005 and No. 2006-032502 filed Feb. 9, 2006, which are hereby incorporated by reference herein in their entirety.

What is claimed is:

1. A method for fabricating a periodic structure having a first layer constituted by a plurality of first columnar members arrayed at first intervals and a second layer constituted by a plurality of second columnar members arrayed at second intervals in a direction different from a long-side direction of the first columnar members, wherein the first layer and the second layer are laminated to each other, the method comprises the steps of:

preparing the first columnar members having the convex parts by a process comprising the steps of:
forming a film made of a material for the first columnar member on a substrate;
forming a first mask at the positions corresponding to the first convex parts on the film;
forming a second mask on the film and on the first mask;
forming grooves on the second mask at the first intervals;
removing the film at the positions corresponding to the grooves;
removing the second mask; and
forming the first convex parts by using the first mask, wherein each first columnar member has a plurality of the first convex parts on a surface, and the length of each first convex part in the long-side direction of the first columnar member is longer than a width of the second columnar members; and laminating the first columnar members and the second columnar members via the first convex parts.

2. The method for fabricating a periodic structure according to claim 1, wherein the second columnar members are each provided with a plurality of second convex parts; and the first convex parts and the second convex parts are laminated to each other.

3. The method for fabricating a periodic structure according to claim 1 or 2, wherein the first columnar members and the second columnar members are laminated so as to be orthogonal to each other when viewed from the laminating direction.

4. The method for fabricating a periodic structure according to claim 1 or 2, wherein the first convex parts are arranged at first periodic intervals and the second columnar members are arranged at second periodic intervals, and the first periodic intervals are the same as the second intervals.

5. The method for fabricating a periodic structure according to claims 1 or 2, wherein each first columnar member is provided with a plurality of third convex parts on the face opposing the face where the first convex parts are formed, and the first convex parts and the third convex parts are formed so as to shift from each other by a half of the first periodic intervals.

6. The method for fabricating a periodic structure according to any one of claims 1 or 2, wherein a plurality of the first layers and the second layers are alternately laminated to each other.

7. The method for fabricating a periodic structure according to claims 1 or 2, wherein the first convex parts are made of a material that is the same material used for the portion of the first columnar member other than for the first convex part.

8. The method for fabricating a periodic structure according to claims 1 or 2, wherein the first convex parts are made of a material that is different from the material used for the portion of the first columnar member other than for the first convex part.

* * * * *

UNITED STATES PATENT AND TRADEMARK OFFICE
CERTIFICATE OF CORRECTION

PATENT NO. : 7,295,745 B2
APPLICATION NO. : 11/411783
DATED : November 13, 2007
INVENTOR(S) : Tatsuro Uchida It is certified that error appears in the above-identified patent and that said Letters Patent is hereby corrected as shown below:

COLUMN 5

Line 53, "structures" should read --structure--.

COLUMN 11

Line 31, "limited" should read --limited to--.

COLUMN 15

Line 10, "second" should read --second periodic--.

Signed and Sealed this

Twenty-third Day of September, 2008

JON W. DUDAS
*Director of the United States Patent and Trademark Office*